Patented Mar. 27, 1928.                                               1,664,173

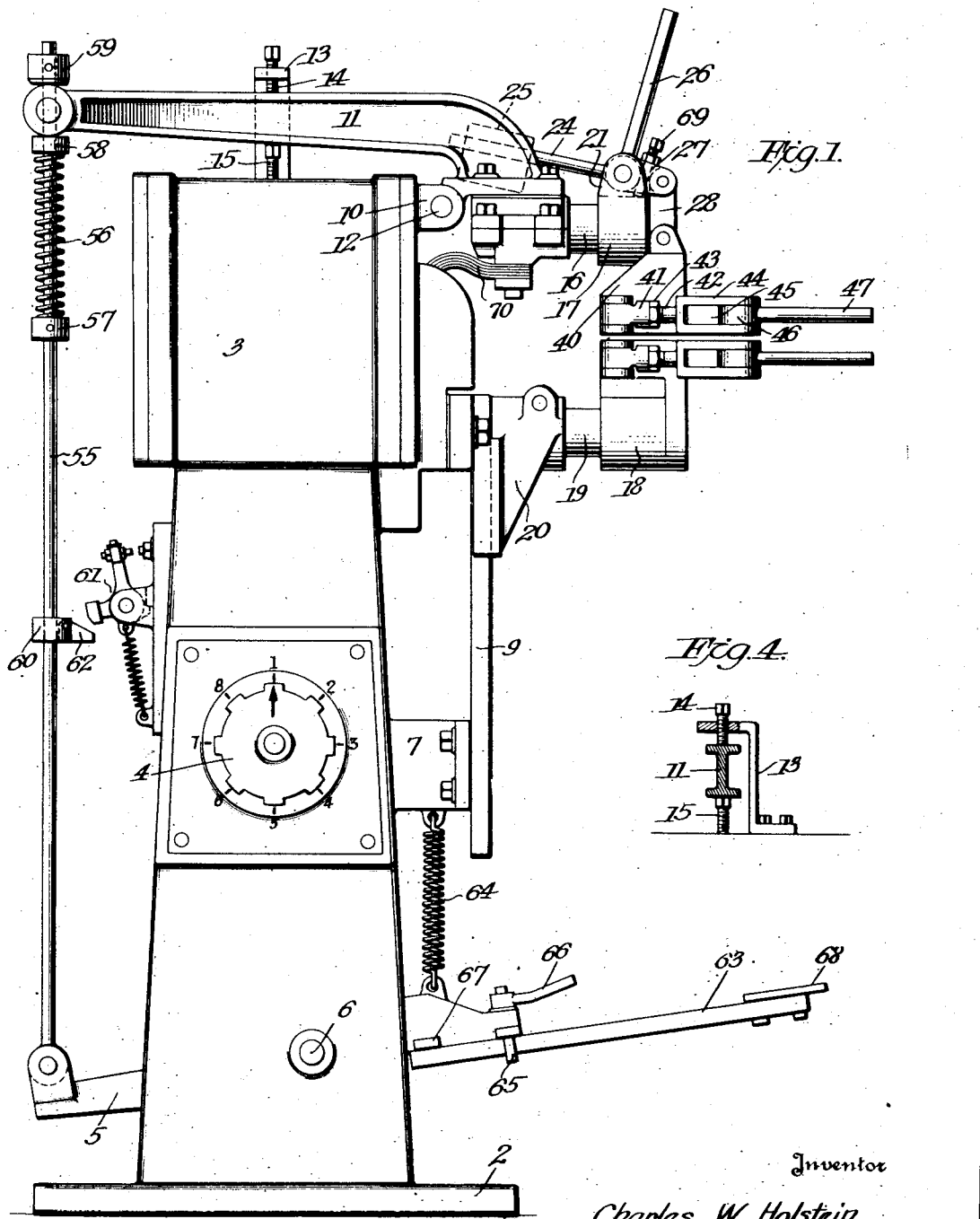

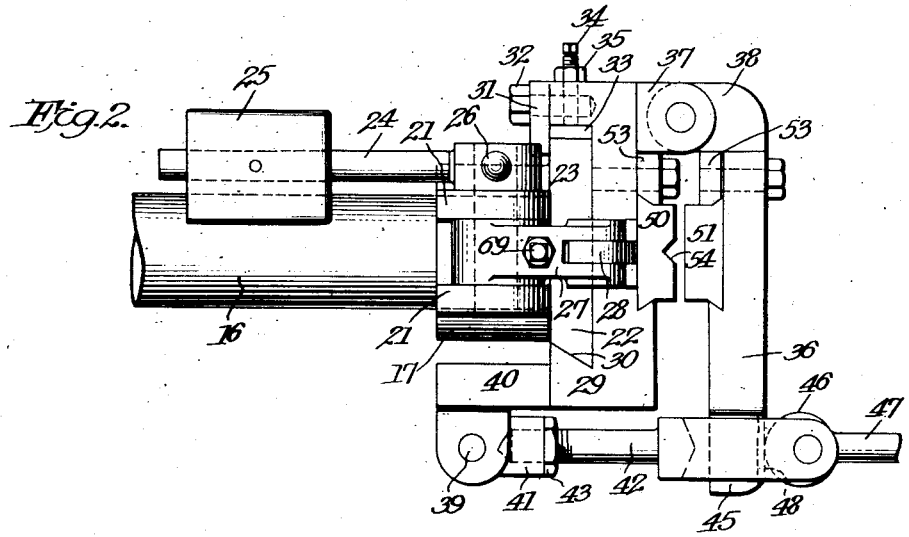
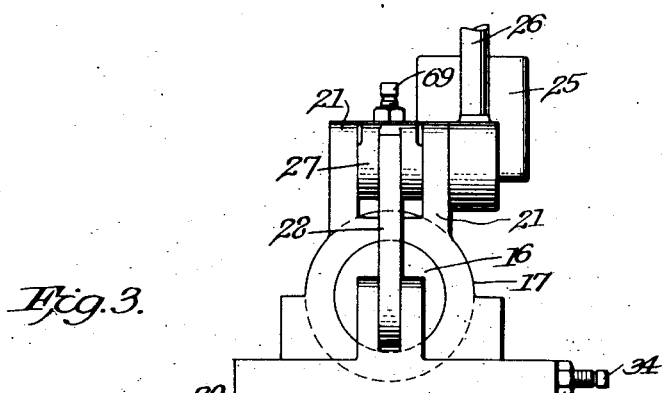
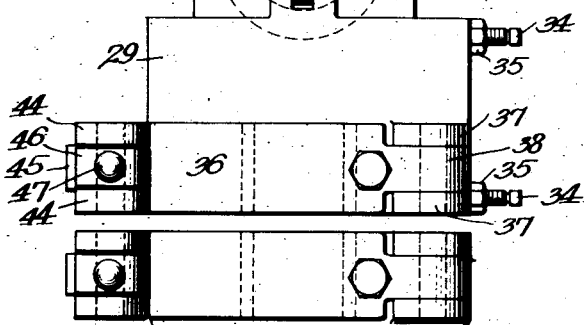

UNITED STATES PATENT OFFICE.

CHARLES W. HOLSTEIN, OF WARREN, OHIO, ASSIGNOR TO THE MONARCH-WELDER MACHINE COMPANY, OF WARREN, OHIO, A CORPORATION OF OHIO.

ELECTRIC-WELDING-MACHINE ATTACHMENT.

Application filed July 11, 1927. Serial No. 204,975.

My invention relates to electric welding apparatus, and comprises fixtures including die-block and clamping members adapted to be used as attachments for spot welding machines of the pivoted conductor-carrier type in place of the usual welding points, whereby such machines may be converted into butt-welding machines.

My invention aims to provide convenient and simple means whereby a single machine may be employed interchangeably for both spot welding and butt-welding. The invention further aims to provide for the substitution of suitable work holders to enable my clamping apparatus to accommodate work of various kinds, thus enabling a single welding machine, with my attachments, to serve a variety of purposes.

Other objects are the provision of work holders suitable, by appropriate adjustments, for a variety of uses, such as T-welding, cross welding, jump welding, flash welding, upsetting, etc., and the provision of means whereby a stronger pressure may be exerted upon the parts to be welded than is otherwise possible with the type of spot-welding machine with which my apparatus is intended to be used.

Still further objects and advantages of my invention will be apparent from the following description of a preferred embodiment of the principles thereof, taken in conjunction with the accompanying drawings, wherein like reference characters apply to like parts in all figures, and wherein Fig. 1 is a side elevation of a spot-welding machine of usual type showing my improved clamping members or jaws applied thereto;

Fig. 2 is a plan view, partly in section, of the upper jaw or clamping member;

Fig. 3 is a front elevation of both jaws, and

Fig. 4 is a detail, in front elevation, of the means for holding the top lever arm of the welding machine stationary, as is required for some varieties of work.

Referring to Fig. 1, a suitable welding machine to which my attachment is adapted for convenient use, comprises a standard 1 rising from a pedestal 2, which may be secured to the floor by any suitable means, not shown. The top of the standard is enlarged, as at 3, providing a transformer housing. About half way up, or in a location readily accessible to the left hand of the operator, a voltage regulator 4 is mounted, which will not be further described, since it forms no part of the present invention, but by which the current may be controlled to suit the work in hand.

A foot lever 5, described in detail below, is pivoted, as at 6, in the bottom of the standard, whereby the current switch may be controlled, as is usual in machines of this type.

Brackets 7 and 8 on the front about the middle and near the top, respectively, afford holds to which a vertical copper guide bar 9 is bolted or otherwise secured. This bar may be insulated from the standard in any suitable manner, and connected to one end of the secondary circuit of the transformer.

On the front of the transformer box 3, near the top, a pair of cast ears 10 carry a top lever arm 11 by means of a pivot 12. In the normal operation of the machine as a spot welder, this arm swings in a vertical plane, but for butt welding this movement may be objectionable. My attachment includes a device for restraining this arm, comprising a bracket 13 fastened to the top of the transformer box 3, its top projecting horizontally above the arm 11 and carrying a vertical set screw 14 capable of engagement with said arm to prevent upward movement of the arm. A second set screw 15, held in a screw hole in the top of the transformer box and beneath the arm may be adjusted to hold the arm against downward displacement; and by adjusting these two set screws the arm may be secured in position parallel to the horizon.

An upper combined electrical conductor and clamp-carrier 16 is rigidly secured to the forward end of the arm 11 in place of the usual point holder, and a collar 17 by which the upper jaw element of my improved clamp is supported, is mounted on and preferably rigidly fastened to the front end thereof.

The lower jaw element of my improved clamp is in like manner supported by a similar collar 18 upon a lower combined conductor and carrier 19. This lower conductor is supported by a slide bracket 20 adapted for vertical movement upon the guide bar 9, and provided with suitable means, such as a T-slot and bolt (not shown) for clamping it at any desired position thereupon.

My upper jaw element, as an entirety, comprises the collar 17, with upstanding ears 21 on its top, a pair of vertical guides 22, 23, best seen in Fig. 2, on the lower part of its front. These ears 21 and guides 22, 23 are preferably integral with the collar 17. A three armed lever is pivoted within the ears 21, the arms, which are mutually rigid, being successively approximately 90° apart and consisting of a rearwardly-extending arm 24, normally extending nearly horizontal and carrying a counterweight 25, an upwardly-extending operating handle 26, and a short forward projecting crank arm 27. A link 28, pivoted at each end, connects the crank arm 27 with a slide plate 29, movable upon the guides 22, 23, thus establishing an operative connection between the lever and the slide plate. For convenience of assembly the guide 22 has one side beveled as at 30, Fig. 2, and the back of the slide plate 29 is correspondingly grooved. The other guide, 23, is of rectangular horizontal section, and the plate 29 is held thereon by a gib 31, attached to the back of the slide plate 29 by cap screws 32. A sliding fit laterally is provided by a wear plate 33, adjustably fastened to the slide plate 29 by screws 34 and lock nuts 35.

A clamp arm 36 is hinged at one end to forwardly-projecting ears 37 on the lower front edge of the slide plate 29 by means of an inturned leaf 38, so that the arm and the plate will be spaced apart when the arm is closed. The free end of the arm 36, which is reduced in thickness, is adapted to be engaged and pressed towards the slide by a clamp which is hinged as at 39 to a rearward side projection 40 of the slide plate 29. This clamp consists of a pivoted sleeve 41, internally threaded, receiving a stud 42, threaded at one end for adjustment as to length, and fitted with a lock nut 43. The outer end of the stud 42 is bifurcated as at 44, Fig. 3, to receive the reduced end 45 of the arm 36. An eccentric 46, operated by a handle 47, is pivoted in the outer end of the bifurcated portion, to enable the arm 36 to be drawn snugly towards the slide plate and held there. A wear plate 48 on the end 45 of the arm takes the thrust of the eccentric.

As best seen in Fig. 2, opposing dies 50 and 51 are secured to the face plate 29 and to the inner face of the arm 36. In the present embodiment these dies are of copper, approximately square in front elevation, rectangular in plan, dovetailed at the back, one dovetail on each being held in a corresponding groove in the plate 29 and arm 36, respectively, the other being under the beveled edges of clamps 53, secured respectively to the plate and the arm by cap screws. The face of the die 50 may be vertically grooved, as shown at 54, or otherwise prepared to receive the articles to be welded.

The bottom jaw comprises a back plate integral with and above the collar 18, similar to the slide plate 29 except that it is not movable relatively to the carrier-conductor 19, a hinged arm, clamp, and dies, all identical in structure and function with the corresponding elements of the upper jaw.

The upper and lower elements of my welder are suitably insulated from the supporting standard in the manner usual in this art, not shown nor further described herein, since such insulation forms no part of my invention. A flexible electrical lead 55, Fig. 1, conducts current to the upper element of my welder. A cable concealed in the standard 1 is connected to the guide 9, thus making the necessary electrical connection to the lower element.

It will be understood that all the parts of my apparatus which serve as conductors are made of brass or copper in accordance with the usual practice, only the mechanical operating parts which have no electrical current conducting function being of steel.

Certain features of my welding machine remain to be described, the use of some of these being varied when the machine is converted from spot welding to butt welding. The rear of the foot lever 5 is connected by a vertical rod 55 to the rear of the top arm 11, a spring 56 and collars 57, 58 and 59 permitting upward movement of the rod 55 even when the arm 11 is immovably clamped by the set screws 14 and 15. About the middle of the rod a trip 60 is mounted, to coact with a switch 61 on the back of the standard 1 in such manner that upward travel of the rod closes the switch, maintains it closed during further travel, and finally allows it to open. The trip 60 is of the latch type, having a tongue 62 which turns up on the downstroke of the rod 55, thus not operating the switch, and so leaving the circuit open as the rod descends. Thus when the machine is used as a butt welder the foot lever does not move the top arm 11, but merely serves as a switch-operating means.

The foot lever is made in two principal parts, the main lever 5, and a front extension 63. The main lever is connected near its front end by a tension spring 64 to the bracket 7, thus normally raising the front end. On the front end of the main lever the extension 63 is pivoted for lateral angular adjustment by an eye bolt 65 and clamp screw 66. Lugs 67 at the sides of the main lever provide a bearing for the rear end of the extension when the parts 5 and 63 are adjusted so as to be out of lengthwise alignment. A treadle or foot piece 68 is attached to the front end of the extension. By this means the operator may set the treadle conveniently at either side of the center of the machine and still be able to operate it satisfactorily and exert the requisite amount of pressure without fatigue.

In operating the machine as a butt welder, two pieces of material to be welded are inserted between the upper and lower pairs of dies 50, 51, the piece in the lower pair projecting, for example, about ⅛ inch above the dies and that in the upper pair projecting about ⅜ inch below the dies, the two pieces abutting. The operator now moves the foot lever down sufficiently to close the switch 61 and keeps the current on until the requisite welding heat is obtained, at which time he cuts off the current by further downward motion of the foot lever, at the same time moving the slide plate 29 down by a forward pull on the hand lever 26, forcing the two pieces of material together and so making the weld. The downward travel of the slide plate 29 is kept within predetermined limits by a stop screw 69 in the short lever arm 27. Thus it is unnecessary for the operator to exercise any judgment as to the distance through which the hand lever 26 must be moved, so that good work may be rapidly turned out by even comparatively unskilled workmen.

It is easy to substitute other clamping means for the vertically grooved dies 50 and plain dies 51 to suit various kinds and shapes of work, and to make the weld with the work pieces at various angles, such as T and cross welds, if desired. Spot welds may be made by inserting the usual welding points in the upper and lower clamping dies and removing the clamp on the pivoted arm 11 so as to operate the machine in its usual manner.

From the foregoing description it is evident that my invention is simple and sturdy in construction, easily attached and operated, and readily fitted with dies suitable for performing all the different kinds of welding operations upon sizes of stock within the welding capacity of the transformer.

The invention is not restricted to the details of construction illustrated.

What I claim as my invention and desire to secure by Letters Patent is:

1. An attachment for a spot welding machine of the type having vertically movable welding points mounted on horizontal conductor-carriers for converting it to a butt welding machine, comprising a die block and clamp carrier adapted to be substituted for the movable conductor-carrier, and a cooperating die block and clamp carrier adapted to be substituted for the stationary conductor-carrier, one of said carriers having a slide upon which the corresponding die block and clamp are mounted, and means for reciprocating said die block and clamp on said slide towards and away from the other die block and clamp.

2. An attachment for a spot welding machine of the type having vertically movable welding points mounted on horizontal conductor-carriers for converting it to a butt welding machine, comprising a die block and clamp carrier adapted to be substituted for the movable conductor-carrier, means for holding said movable carrier in parallel alinement with the axis of the stationary conductor-carrier and a cooperating die block and clamp carrier adapted to be substituted for the stationary conductor-carrier, one of said carriers having a slide upon which the corresponding die block and clamp are mounted, and means for reciprocating said die block and clamp on said slide towards and away from the other die block and clamp.

3. An attachment for a spot welding machine of the type having vertically movable welding points mounted on horizontal conductor-carriers, comprising a die block and clamp carrier adapted to be substituted for the welding point, means for holding the movable carrier in parallel alinement with the axis of the stationary conductor-carrier and a cooperating die block and clamp carrier adapted to be substituted for the stationary welding point, one of said carriers having a slide upon which the corresponding die block and clamp are mounted, and means for reciprocating said die block and clamp on said slide towards and away from the other die block and clamp.

4. In an attachment for welding machines, a clamp member comprising a fixed die holder and a movable die holder provided with grooves for positioning the dies, dies removably secured in said grooves, the movable die holder being pivoted to the fixed die holder at one side, a yoke having a threaded stem and carrying an eccentric adapted to embrace and engage the free end of said movable die holder, a lever for operating said eccentric, said yoke being pivotally secured to said fixed die holder on the side remote from the hinge for the movable die holder by means of a hinged nut into which its stem screws, and a lock nut on said stem, whereby said die holders may be readily brought together and clamped to secure a work piece between them.

5. A fixture for a spot welding machine comprising a bracket and carrier arm adapted to be substituted for a welding point carrier of said machine, said bracket having a vertical slideway on its outer face, a work holding and clamp device slidably mounted thereon to move vertically, means mounted on said bracket and including a counter weight for moving said clamping device up and down, said work holding and clamping device including removable work engaging dies.

6. A fixture for a spot welding machine comprising a bracket adapted to be substituted for a welding point of said machine, said bracket having a vertical slideway on its outer face, a work holding and clamping device slidably mounted thereon to move vertically, means mounted on said bracket and including a counter weight for moving said clamping device up and down, said work holding and clamping device including removable work engaging dies.

7. A welding machine comprising a vertical pedestal for housing the electrical transformer and control devices, two horizontal conductor-carrier arms carried by and projecting from the upper portion of said pedestal one above the other, said conductor-carriers being made of a good electrical conducting material and insulated from said pedestal and electrically connected to said transformer, brackets mounted on the outer ends of said conductor-carriers, adjustable work clamping bars horizontally disposed one above the other on said brackets, cooperating work engaging die blocks carried by said brackets and bars, means for clamping said bars to said brackets, and means for moving one of said bars and cooperating die-block vertically with respect to the other bar.

8. A welding machine comprising a vertical pedestal for housing the electrical transformer and control devices, two horizontal conductor-carrier arms carried by and projecting from the upper portion of said pedestal one above the other, said conductor-carriers being made of a good electrical conducting material and insulated from said pedestal and electrically connected to said transformer, a bracket mounted on the outer end of one of said conductor-carriers and a vertically movable slide mounted on the outer end of the other conductor-carrier, adjustable work clamping bars horizontally disposed one above the other on said bracket and slide, respectively, cooperating work engaging die blocks carried by said bracket, slide and bars, means for clamping said bars to said bracket and slide, respectively, and means for moving said slide and cooperating bar vertically with respect to the other bar.

In testimony whereof, I have signed my name to this specification.

CHARLES W. HOLSTEIN.